UNITED STATES PATENT OFFICE.

HIRAM HURTY, OF ELMIRA, NEW YORK.

LUBRICANT.

SPECIFICATION forming part of Letters Patent No. 237,437, dated February 8, 1881.

Application filed April 17, 1880. (No specimens.)

*To all whom it may concern:*

Be it known that I, HIRAM HURTY, of Elmira, in the county of Chemung and State of New York, have invented a new and Improved Lubricant; and I do hereby declare the following to be a full, clear, and exact description of the same, which will enable any person skilled in the art to which the invention appertains, or with which it is most closely connected, to make and use the same.

My invention consists of a lubricant composed of plumbago and common salt, in about equal proportions, finely pulverized and thoroughly mixed together.

This lubricant has been practically used for the lubrication of various kinds of machinery with the most satisfactory results. Its operation is to greatly reduce the friction of bearings and to keep them cool. When applied to red-hot car-axle journals it will cool them down to the proper point without stopping the running of the train longer than to apply it, thus rendering unnecessary the use of water or other injurious cooling agents, and saving a great deal of time.

The lubricant may be used in connection with oil in some cases; but the oil is by no means an essential ingredient.

I claim as my invention—

The lubricant herein described, composed of plumbago and common salt in about equal proportions, finely pulverized and mixed together, substantially as set forth.

HIRAM HURTY.

Witnesses:
L. HILL,
M. CHURCH.